United States Patent
Ueda et al.

(10) Patent No.: US 10,452,587 B2
(45) Date of Patent: Oct. 22, 2019

(54) PROCESSING APPARATUS AND CONTROL METHOD THEREOF

(71) Applicant: Renesas Electronics Corporation, Tokyo (JP)

(72) Inventors: Hiroshi Ueda, Tokyo (JP); Seiji Mochizuki, Tokyo (JP); Toshiyuki Kaya, Tokyo (JP); Kenichi Iwata, Tokyo (JP); Katsushige Matsubara, Tokyo (JP)

(73) Assignee: RENESAS ELECTRONICS COPRORATION, Tokyo (JP)

( * ) Notice: Subject to any disclaimer, the term of this patent is extended or adjusted under 35 U.S.C. 154(b) by 91 days.

(21) Appl. No.: 14/965,612

(22) Filed: Dec. 10, 2015

(65) Prior Publication Data
US 2016/0283430 A1  Sep. 29, 2016

(30) Foreign Application Priority Data

Mar. 25, 2015  (JP) .................. 2015-062272

(51) Int. Cl.
| | | |
|---|---|---|
| *G06F 13/40* | (2006.01) | |
| *G06F 13/28* | (2006.01) | |
| *G06F 9/50* | (2006.01) | |
| *H04N 19/176* | (2014.01) | |
| *H04N 19/423* | (2014.01) | |
| *H04N 19/436* | (2014.01) | |

(52) U.S. Cl.
CPC ........ *G06F 13/4068* (2013.01); *G06F 9/5066* (2013.01); *G06F 13/28* (2013.01); *H04N 19/176* (2014.11); *H04N 19/423* (2014.11); *H04N 19/436* (2014.11)

(58) Field of Classification Search
None
See application file for complete search history.

(56) References Cited

U.S. PATENT DOCUMENTS

| | | |
|---|---|---|
| 8,223,838 B2 | 7/2012 | Iwata et al. |
| 2008/0031329 A1 | 2/2008 | Iwata et al. |
| | (Continued) | |

FOREIGN PATENT DOCUMENTS

| | | |
|---|---|---|
| JP | S62-061446 A | 3/1987 |
| JP | S64-042741 A | 2/1989 |
| | (Continued) | |

OTHER PUBLICATIONS

Extended European Search Report dated Aug. 1, 2016.
(Continued)

*Primary Examiner* — Farley Abad
*Assistant Examiner* — Dayton Lewis-Taylor
(74) *Attorney, Agent, or Firm* — McGinn I.P. Law Group, PLLC.

(57) ABSTRACT

A plurality of transfer modules (402-0 to 402-M) that transfer data between processing units are provided so as to respectively correspond to a plurality of processing units (401-0 to 401-M). First ring buses (403-0 to 403-M) connect, for each of the processing units (401-0 to 401-M), subunits within a corresponding processing unit and the transfer module corresponding to the processing unit so that they form a ring shape. The plurality of transfer modules (402-0 to 402-M) are connected so that they form a ring shape by a second ring bus (404).

18 Claims, 15 Drawing Sheets

(56) References Cited

U.S. PATENT DOCUMENTS

| | | | |
|---|---|---|---|
| 2011/0145837 A1* | 6/2011 | Bower | G06F 9/542 |
| | | | 719/317 |
| 2012/0113271 A1 | 5/2012 | Haraguchi | |
| 2013/0311817 A1 | 11/2013 | Kim et al. | |
| 2015/0006776 A1 | 1/2015 | Liu et al. | |

FOREIGN PATENT DOCUMENTS

| | | | | |
|---|---|---|---|---|
| JP | H05-181817 A | 7/1993 | | |
| JP | 2008-042571 A | 2/2008 | | |
| JP | 2012-103772 A | 5/2012 | | |
| WO | WO 2013081579 A1 * | 6/2013 | | G06F 13/1668 |

OTHER PUBLICATIONS

"An Introduction to the Intel QuickPath Interconnect", Jan. 1, 2009 (Jan. 1, 2009), XP055059695, Retrieved from the Internet: URL:http://www.intel.com/content/dam/doc/white-paper/quick-path-interconnect-introduction-paper.pdf [retrieved on Apr. 16, 2013].

Japanese Office Action dated Sep. 4, 2018 in corresponding Japanese Patent Application No. 2015-062272, with an English translation thereof.

European Patent Office Communication pursuant to Article 94(c) EPC dated Mar. 8, 2019, in corresponding Patent Application No. 16 162 394.7.

\* cited by examiner

P1 TRANSFER PATH OF RELATED ART

PROCESSING APPARATUS AND CONTROL METHOD THEREOF

CROSS-REFERENCE TO RELATED APPLICATIONS

This application is based upon and claims the benefit of priority from Japanese patent application No. 2015-062272, filed on Mar. 25, 2015, the disclosure of which is incorporated herein in its entirety by reference.

BACKGROUND

The present invention relates to a processing apparatus, and can be suitably used for, for example, a processing apparatus including a plurality of processing units.

One of the techniques for improving the processing performance of a processing apparatus is parallel processing. When parallel processing is implemented in a processing apparatus, for example, a plurality of processing units capable of parallel processing are provided (for example, see Japanese Unexamined Patent Application Publication Nos. 2008-42571 and H05-181817). Techniques disclosed in Japanese Unexamined Patent Application Publication Nos. 2008-42571 and H05-181817 will be described below.

First, the technique disclosed in Japanese Unexamined Patent Application Publication No. 2008-42571 will be described with reference to FIG. 14. FIG. 14 is a diagram showing a block configuration example of a moving picture processing apparatus, which corresponds to the configuration shown in FIG. 1 of Japanese Unexamined Patent Application Publication No. 2008-42571. The moving picture processing apparatus shown in FIG. 14 includes two moving picture processing units, i.e., a Codec_EL_0 601-0 and a Codec_EL_1 601-1. Each of the Codec_EL_0 601-0 and the Codec_EL_1 601-1 includes a plurality of functional subunits. The configuration shown in FIG. 14 includes a variable length coding unit (VLC) 6010, a frequency transform unit (TRF) 6011, and a motion compensation unit (MC) 6012 as functional subunits. Each of the Codec_EL_0 601-0 and the Codec_EL_1 601-1 further includes a plurality of input/output interfaces (IO: Input-Output) 605 which are respectively connected to the plurality of functional subunits. The Codec_EL_0 601-0 and the Codec_EL_1 601-1 are connected so that they form a ring shape by a ring bus through the input/output interface 605. The input/output interface 605 disposed at a tail-end of the Codec_EL_0 601-0 is connected to the input/output interface 605 disposed at a front-end of the Codec_EL_1 601-1. The moving picture processing apparatus shown in FIG. 14 also includes an LM (Line Memory) 602, a DMAC (Direct Memory Access Controller) 603, and a Mem_Cnt 604. The DMAC 603 is a direct memory access controller that transfers a bit stream to the Codec_EL_0 601-0 and the Codec_EL_1601-1. The Mem_Cnt 604 is a controller that supplies macroblock (MB) data to the Codec_EL_0 601-0 and the Codec_EL_1 601-1. The LM 602 is a line memory that stores, for example, the processing result of the Codec_EL_0 601-0.

Next, the technique disclosed in Japanese Unexamined Patent Application Publication No. H05-181817 will be described with reference to FIG. 15. FIG. 15 is a diagram showing a block configuration example of a parallel processing apparatus, which corresponds to a configuration shown in FIG. 2 of Japanese Unexamined Patent Application Publication No. H05-181817. The parallel processing apparatus shown in FIG. 15 includes a plurality of layers each including a pipelined ring bus 701 that connects a plurality of processing elements (PEs) 700 so that they form a ring shape. The parallel processing apparatus shown in FIG. 15 further includes a packet control device 703 that communicates packets with the PEs 700 in a first row of each layer. The PEs 700 in the second to fourth rows of each layer are sequentially connected to the PEs 700 in the layer immediately below the corresponding layer via a ring bus 702, and have a function of retrieving an output of each PE 700 in the layer above the corresponding layer into the pipelined ring bus 701 of the corresponding layer. The layers are sequentially connected in this manner, thereby allowing packets to flow from a certain pipelined ring bus 701 to another pipelined ring bus 701 without involving the packet control device 703. As a result, the load on the packet control device 703 can be reduced. When queues of the PEs 700 in the first row of a certain layer are congested, it is possible to cause packets to flow from another layer. For example, in the case of causing packets to flow to a PE (3,4), the packet control device 703 can cause packets to flow in a path as indicated by thick arrows, i.e., a path that passes through a PE (3,1), a PE (3,2), a PE (3,3), and the PE (3,4). When queues of the PE (3,1) are congested, the packet control device 703 can cause packets to flow in a path as indicated by thick arrows, i.e., a path that passes through a PE (1,1), a PE (1,2), a PE (2,2), a PE (2,3), the PE (3,3), and the PE (3,4).

SUMMARY

However, the techniques disclosed in Japanese Unexamined Patent Application Publication Nos. 2008-42571 and H05-181817 have the following problems.

First, a problem with the technique disclosed in Japanese Unexamined Patent Application Publication No. 2008-42571 will be described with reference to FIG. 14. In the moving picture processing apparatus shown in FIG. 14, the Codec_EL_0 601-0 and the Codec_EL_1 601-1 are connected so that they form a ring shape by a ring bus. Accordingly, for example, when the functional subunits within the Codec_EL_0 601-0 transfer data to different functional subunits within the Codec_EL_0 601-0 across the Codec_EL_1 601-1, there is a problem that the length of the transfer path increases. For example, a case where the TRF 6011 within the Codec_EL_0 601-0 transfers data to the VLC 6010 within the Codec_EL_0 601-0 will be considered. In this case, the data needs to pass through the Codec_EL_1 601-1 and the LM 602, which results in an increase in the length of the transfer path. In this case, the data of the Codec_EL_0 601-0 flows to the Codec_EL_1 601-1. Thus, there is a problem that the bus traffic of the Codec_EL_1 601-1 increases due to the data of the other Codec_EL_0 601-0.

Next, a problem with the technique disclosed in Japanese Unexamined Patent Application Publication No. H05-181817 will be described with reference to FIG. 15. The parallel processing apparatus shown in FIG. 15 includes a plurality of layers each including the pipelined ring bus 701 that connects a plurality of PEs 700 so that they form a ring shape. By providing the plurality of layers each including the pipelined ring bus 701, the problem that there is an increase in the length of the transfer path of the ring bus, which is a problem with the technique disclosed in Japanese Unexamined Patent Application Publication No. 2008-42571, can be solved. However, the packets which are not addressed to the PEs 700 of the corresponding layer are caused to flow through the pipelined ring bus 701. Accordingly, the problem that there is an increase in the bus traffic due to the packets in other layers, which is a problem with the technique disclosed in Japanese Unexamined Patent Application Publication No. 2008-42571, is still unsolved.

Hereinafter, a plurality of embodiments that contribute to solving at least one of a plurality of problems including the above-mentioned problems will be described. It should be noted that the above-mentioned problems are merely examples of the plurality of problems to be solved by the embodiments disclosed herein. Other problems to be solved by and novel features of the present invention will become apparent from the following description and the accompanying drawings.

A first aspect of the present invention is a processing apparatus including a plurality of transfer modules that are provided so as to respectively correspond to a plurality of processing units and transfer data between the processing units. For each of the plurality of processing units, subunits within a corresponding processing unit and the transfer module corresponding to the processing unit are connected so that they form a ring shape by a first ring bus. Further, the plurality of transfer modules are connected so that they form a ring shape by a second ring bus.

The first aspect of the present invention contributes to solving the above-mentioned problems.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
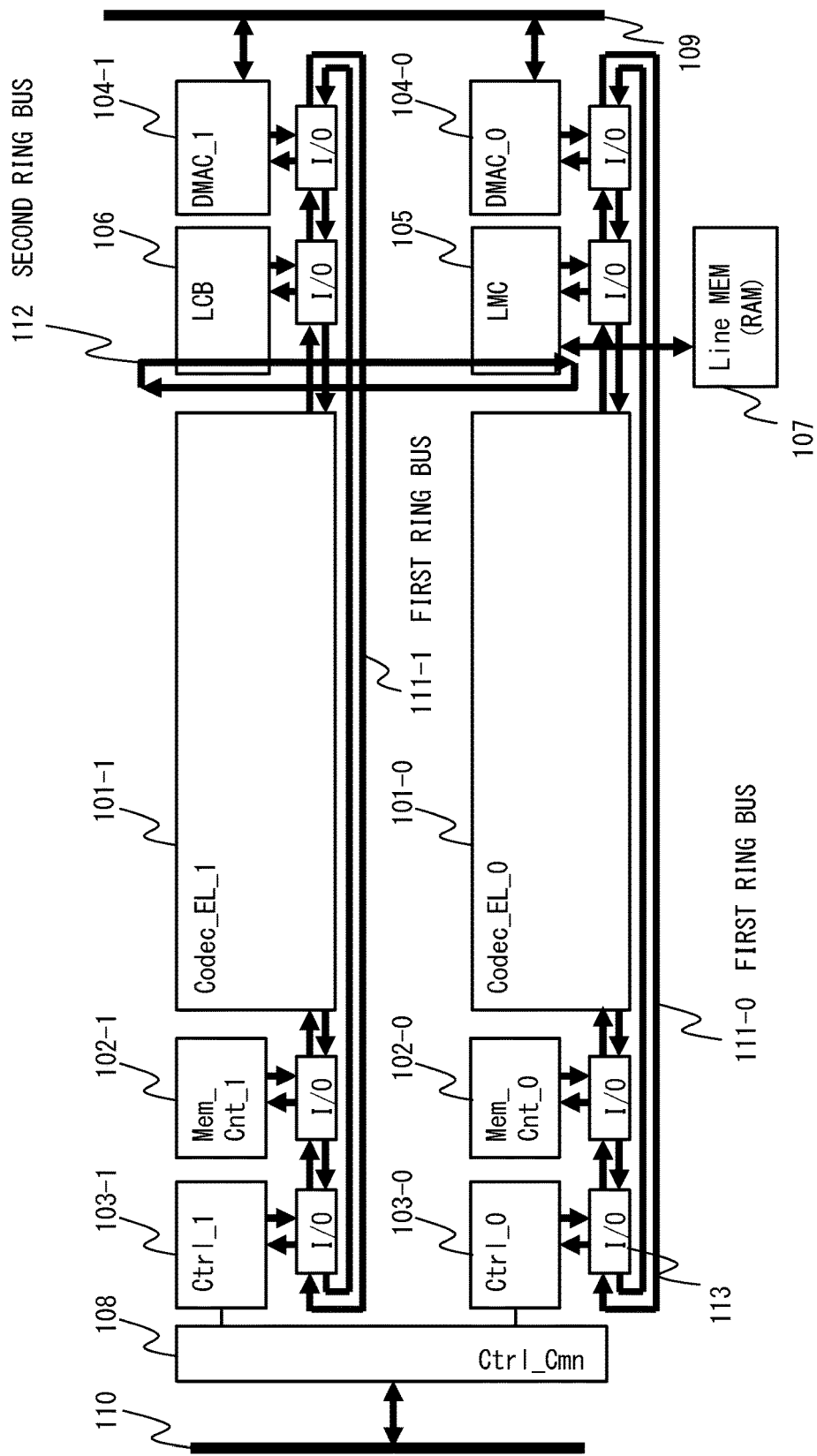
FIG. 1 is a diagram showing a block configuration example of a moving picture coding/decoding apparatus according to a first embodiment.

Specific embodiments of the present invention will be described below with reference to the drawings. The following description and the drawings are omitted or simplified as appropriate for clarity of explanation. The elements illustrated in the drawings as functional blocks for performing various processes can be implemented hardwarewise by a CPU, a memory, and other circuits, and softwarewise by a program loaded into a memory or the like. Accordingly, it is understood by those skilled in the art that these functional blocks can be implemented in various forms including, but not limited to, hardware alone, software alone, and a combination of hardware and software. Note that in the drawings, the same elements are denoted by the same reference numerals, and a repeated description is omitted as needed.

(1) First Embodiment
(1-1) Configuration of First Embodiment

The first embodiment illustrates an example in which a moving picture coding/decoding apparatus is used as a processing apparatus. This moving picture coding/decoding apparatus includes a plurality of moving picture processing units each serving as a processing unit.

FIG. 1 is a diagram showing a block configuration example of the moving picture coding/decoding apparatus according to the first embodiment. The moving picture coding/decoding apparatus according to the first embodiment includes two moving picture processing units, i.e., a Codec_EL_0 101-0 and a Codec_EL_1 101-1. The number of moving picture processing units is not limited to two as shown in FIG. 1. Any number of moving picture processing units may be provided, as long as a plurality of moving picture processing units are provided.

Figure 2:
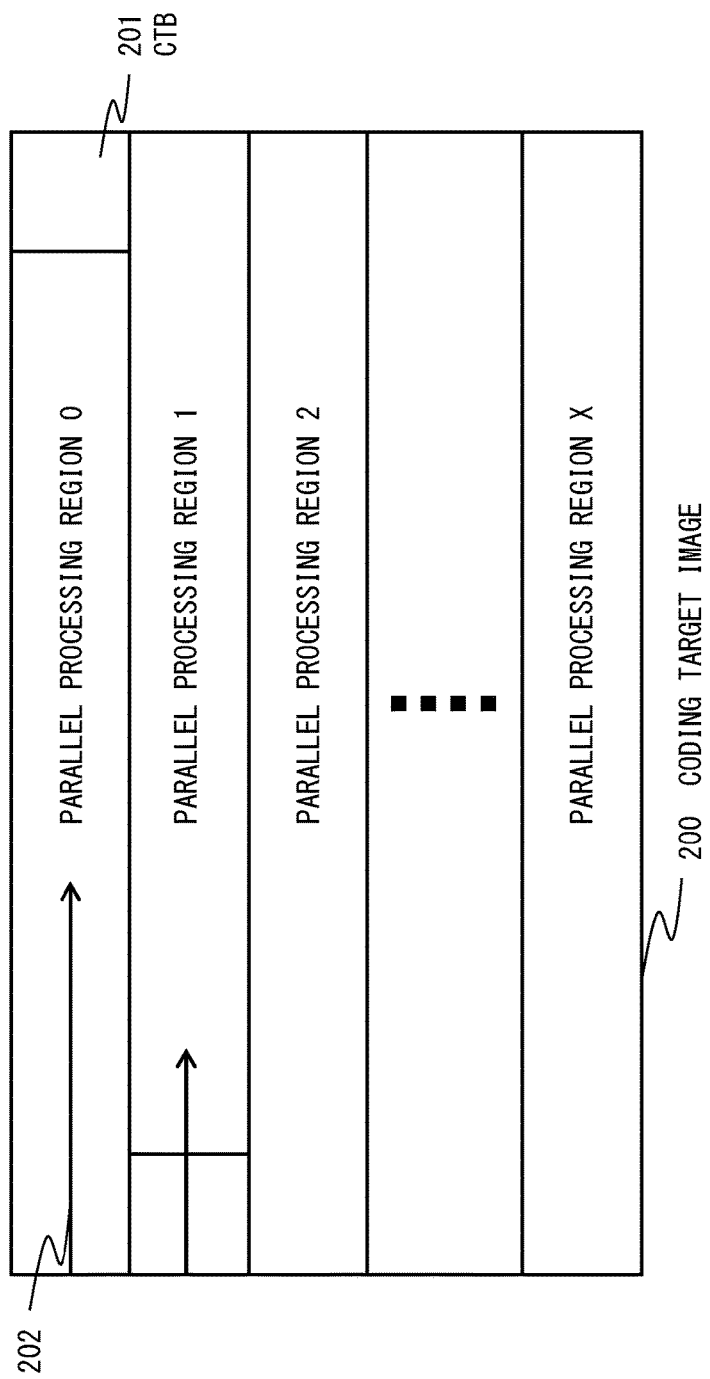
FIG. 2 is a diagram showing an example of parallel processing in the moving picture coding/decoding apparatus according to the first embodiment.

FIG. 2 is a diagram showing an example of parallel processing in the moving picture coding/decoding apparatus according to the first embodiment. The moving picture coding/decoding apparatus according to the first embodiment performs, for example, coding processing and decoding processing on a coding target image 200 as shown in FIG. 2. In this case, the coding target image 200 is divided into X (X is a natural number equal to or greater than 1)+1 parallel processing regions 0 to X, and the Codec_EL_0 101-0 and the Codec_EL_1 101-1 processes the parallel processing regions 0 to X in parallel. For example, the Codec_EL_0 101-0 can sequentially process the even-numbered parallel processing regions, such as the 0th parallel processing region 0 and the second parallel processing region 2. On the other hand, the Codec_EL_1 101-1 can sequentially process the odd-numbered parallel processing regions, such as the first parallel processing region 1 and the third parallel processing region 3. Referring to FIG. 2, the cording target image is divided into parallel processing regions for each line of a coding tree block (CTB) 201, assuming that standards such as H.265 are used. However, any method can be employed in order to divide the coding target image into parallel processing regions. For example, in the standards such as H.264, the coding target image can be divided into parallel processing regions for each line of a microblock (MB). Further, in each of the parallel processing regions 0 to X, coding processing and decoding processing are performed for each TB 201 along a processing direction 202.

Figure 3:
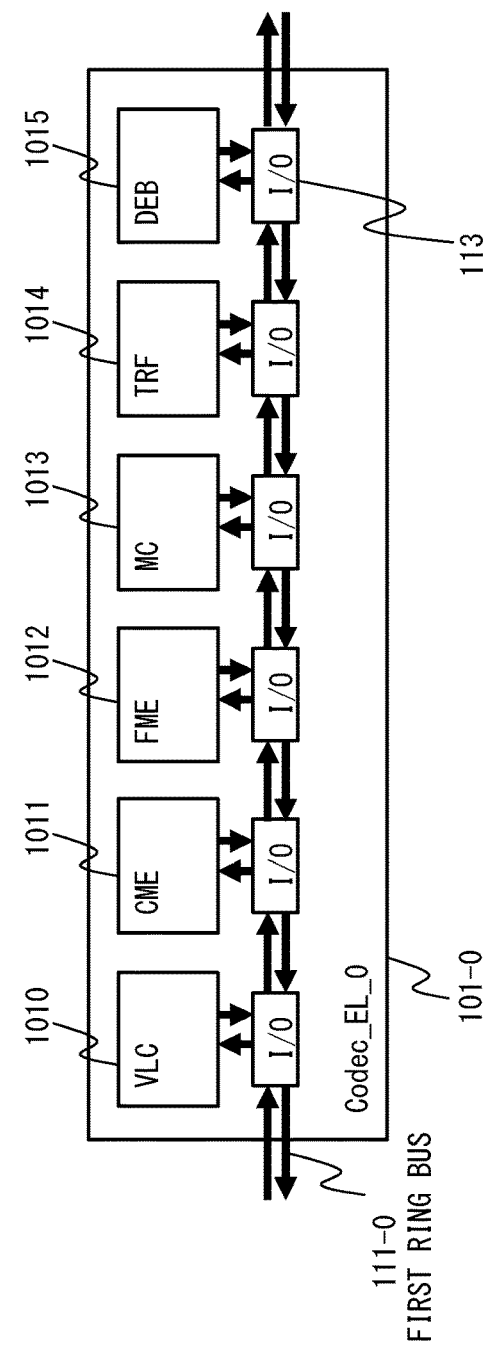
FIG. 3 is a diagram showing examples of functional subunits within a moving picture processing unit according to the first embodiment.
Figure 14:
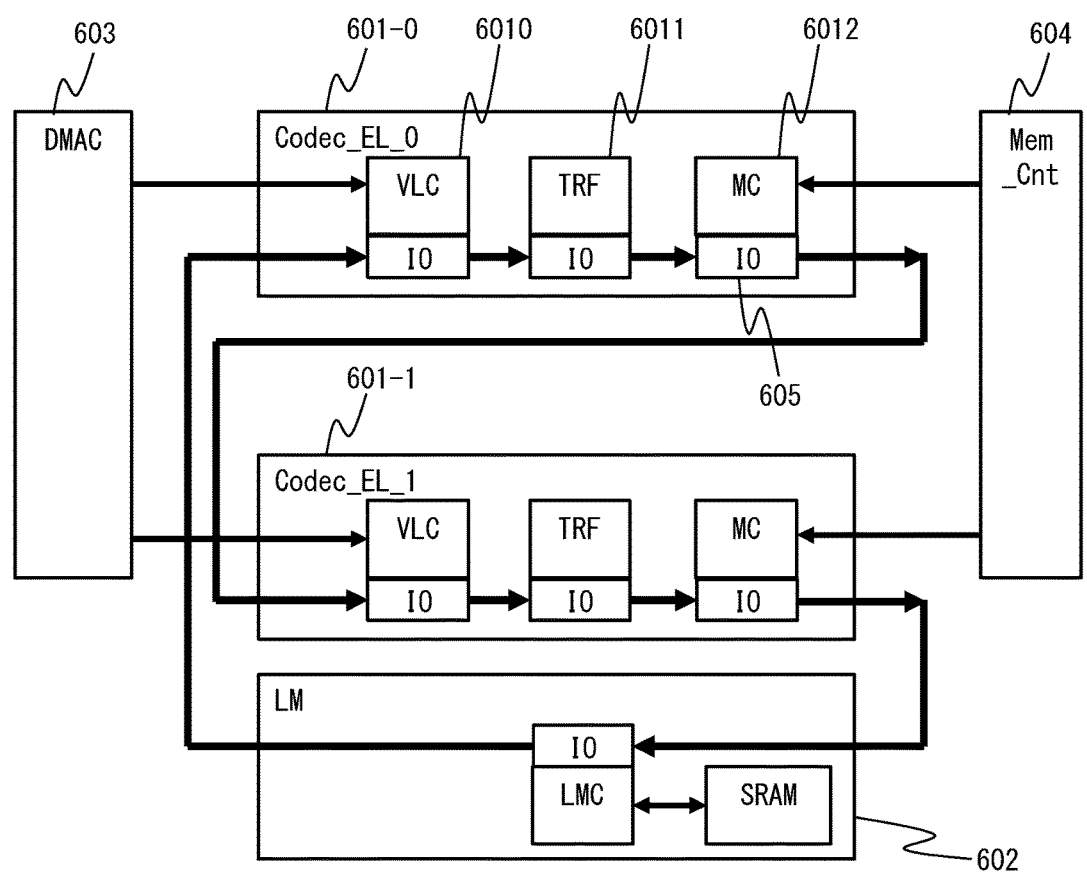
FIG. 14 is a diagram showing a block configuration example of a moving picture processing apparatus, which corresponds to a configuration disclosed in Japanese Unexamined Patent Application Publication No. 2008-42571.
Figure 15:
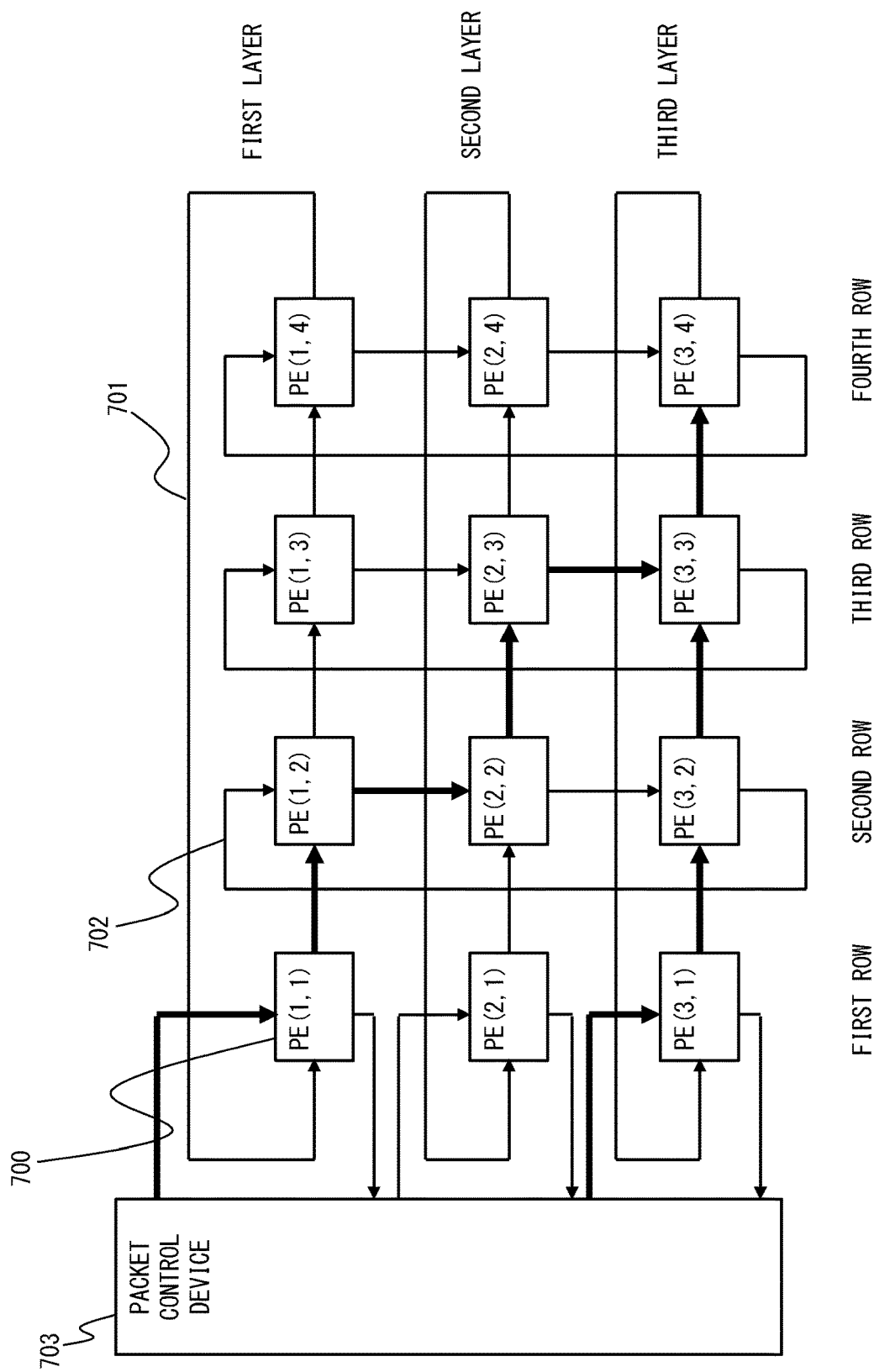
FIG. 15 is a diagram showing a block configuration example of a parallel processing apparatus, which corresponds to a configuration disclosed in Japanese Unexamined Patent Application Publication No. H05-181817.

FIG. 3 is a diagram showing examples of functional subunits within the Codec_EL_0 101-0. The Codec_EL_0 101-0 includes a plurality of functional subunits as shown in FIG. 3. In the example of FIG. 3, a variable length coding unit (VLC) 1010, a motion compensation unit (MC) 1013, and a frequency transform unit (TRF) 1014 are provided as functional subunits, as in the case of FIG. 14. In the example of FIG. 3, an integer pixel accuracy motion estimation unit (CME: Coarse Motion Estimation) 1011, a fractional pixel accuracy motion estimation unit (FME: Fine Motion Estimation) 1012, and a deblocking filter processing unit (DEB: DEBlocking) 1015 are also provided as functional subunits. The Codec_EL_0 101-0 also includes a plurality of input/output interfaces (IO) 113 which are respectively connected to the plurality of functional subunits. The plurality of input/output interfaces 113 are connected so that they form a ring shape by a first ring bus 111-0. The Codec_EL_1 101-1 has the same configuration as that shown in FIG. 3.

Referring to FIG. 1 again, the moving picture coding/decoding apparatus according to the first embodiment further includes a Ctrl_0 103-0, a Mem_Cnt_0 102-0, an LMC (Line Memory Controller) 105, and a DMAC_0 104-0, which are provided for the Codec_EL_0 101-0. The moving picture coding/decoding apparatus according to the first embodiment further includes a Ctrl_1 103-1, a Mem_Cnt_1 102-1, an LCB (Line Control Block) 106, and a DMAC_1 104-1, which are provided for the Codec_EL_1 101-1. The moving picture coding/decoding apparatus according to the first embodiment further includes a Line MEM 107, a Ctrl_Cmn 108, a master bus 109, and a bus 110.

The Mem_Cnt_0 102-0 is a controller that controls reading and writing of moving picture data from and to a moving picture memory (not shown) which stores moving picture data to be supplied to the Codec_EL_0 101-0. The Mem_Cnt_1 102-1 is a controller that controls reading and writing of moving picture data from and to a moving picture memory (not shown) which stores moving picture data to be supplied to the Codec_EL_1 101-1. The Line MEM 107 is a line memory which stores, for example, the processing results of the Codec_EL_0 101-0 and the Codec_EL_1 101-1, and is composed of a RAM (Random Access Memory) or the like. The LMC 105 is a module that controls reading and writing of, for example, the processing results, from and to the Line MEM 107. For example, the LMC 105 writes the processing result of the Codec_EL_0 101-0 to the Line MEM 107. Further, the LMC 105 receives the processing result of the Codec_EL_1 101-1 from the LCB 106, and writes the received processing result to the Line MEM 107. The LMC 105 reads out the processing result of the Codec_EL_0 101-0 from the Line MEM 107, and transfers the read processing result to the LCB 106. Furthermore, the LMC 105 reads out the processing result of the Codec_EL_1 101-1 from the Line MEM 107, and transfers the read processing result to the Codec_EL_0 101-0. The LCB 106 is a module that transfers the data of the Codec_EL_1 101-1 to the LMC 105 of the Codec_EL_0 101-0. For example, the LCB 106 transfers the processing result of the Codec_EL_1 101-1 to the LMC 105. Further, the LCB 106 receives the processing result of the Codec_EL_0 101-0 from the LMC 105, and transfers the received processing result to the Codec_EL_1 101-1. The DMAC_0 104-0 is a controller that serves as a bus IF for connecting the Mem_Cnt_0 102-0, the Codec_EL_0 101-0, and the like to the master bus 109. The DMAC_1 104-1 is a controller that serves as a bus IF for connecting the Mem_Cnt_1 102-1, the Codec_EL_1 101-1, and the like to the master bus 109. The Ctrl_0 103-0 is a controller that controls the operations of the Codec_EL_0 101-0, the Mem_Cnt_0 102-0, the LMC 105, the DMAC_0 104-0, and the like. The Ctrl_1 103-1 is a controller that controls the operations of the Codec_EL_1 101-1, the Mem_Cnt_1 102-1, the LCB 106, the DMAC_1 104-1, and the like. The Ctrl_Cmn 108 is a controller that controls the entirety of the Codec_EL_0 101-0 and the Codec_EL_1 101-1. The master bus 109 is a bus for connecting the DMAC_0 104-0 and the DMAC_1 104-1 to each other. The bus 110 is a bus for setting a register in each of the Ctrl_0 103-0 and the Ctrl_1 103-1. The master bus 109 and the bus 110 may be the same bus. FIG. 1 illustrates that the DMAC_0 104-0 and the DMAC_1 104-1 are each connected to the master bus 109, but the DMAC_0 104-0 and the DMAC_1 104-1 may be connected to different buses.

In the moving picture coding/decoding apparatus of the first embodiment, the Ctrl_0 103-0, the Mem_Cnt_0 102-0, the functional subunits within the Codec_EL_0 101-0, the LMC 105, and the DMAC_0 104-0 are connected so that they form a ring shape by the first ring bus 111-0. Similarly, the Ctrl_1 103-1, the Mem_Cnt_1 102-1, the functional subunits within the Codec_EL_1 101-1, the LCB 106, and the DMAC_1 104-1 are connected so that they form a ring shape by a first ring bus 111-1. The first ring buses 111-0 and 111-1 are bidirectional ring buses which are composed of two clockwise and counterclockwise ring buses having opposite transfer directions. The LCB 106 and the LMC 105 are connected so that they form a ring shape by a second ring bus 112 which is different from the first ring buses 111-0 and 111-1.

The first embodiment illustrates an example in which each of the Codec_EL_0 101-0 and the Codec_EL_1 101-1 includes a plurality of functional subunits. However, it is not necessary to employ such a hierarchical structure. The functional subunits are not limited to the ones shown in FIG. 3. The number and types of the functional subunits are not particularly limited, as long as they can implement functions for performing coding processing and decoding processing on a moving picture. The Ctrl_m (m=0, 1) 103-m, the Mem_Cnt_m 102-m, the subunits within the Codec_EL_m 101-m, the LMC 105 (or the LCB 106), and the DMAC_m 104-m may be connected in a different order from that of the first embodiment, and may be composed of different modules as long as they can implement functions for performing coding processing and decoding processing on a moving picture.

(1-2) Operation of First Embodiment

The transfer path in the moving picture coding/decoding apparatus according to the first embodiment will be described in comparison to a transfer path in a moving picture coding/decoding apparatus of a related art.

Figure 4:
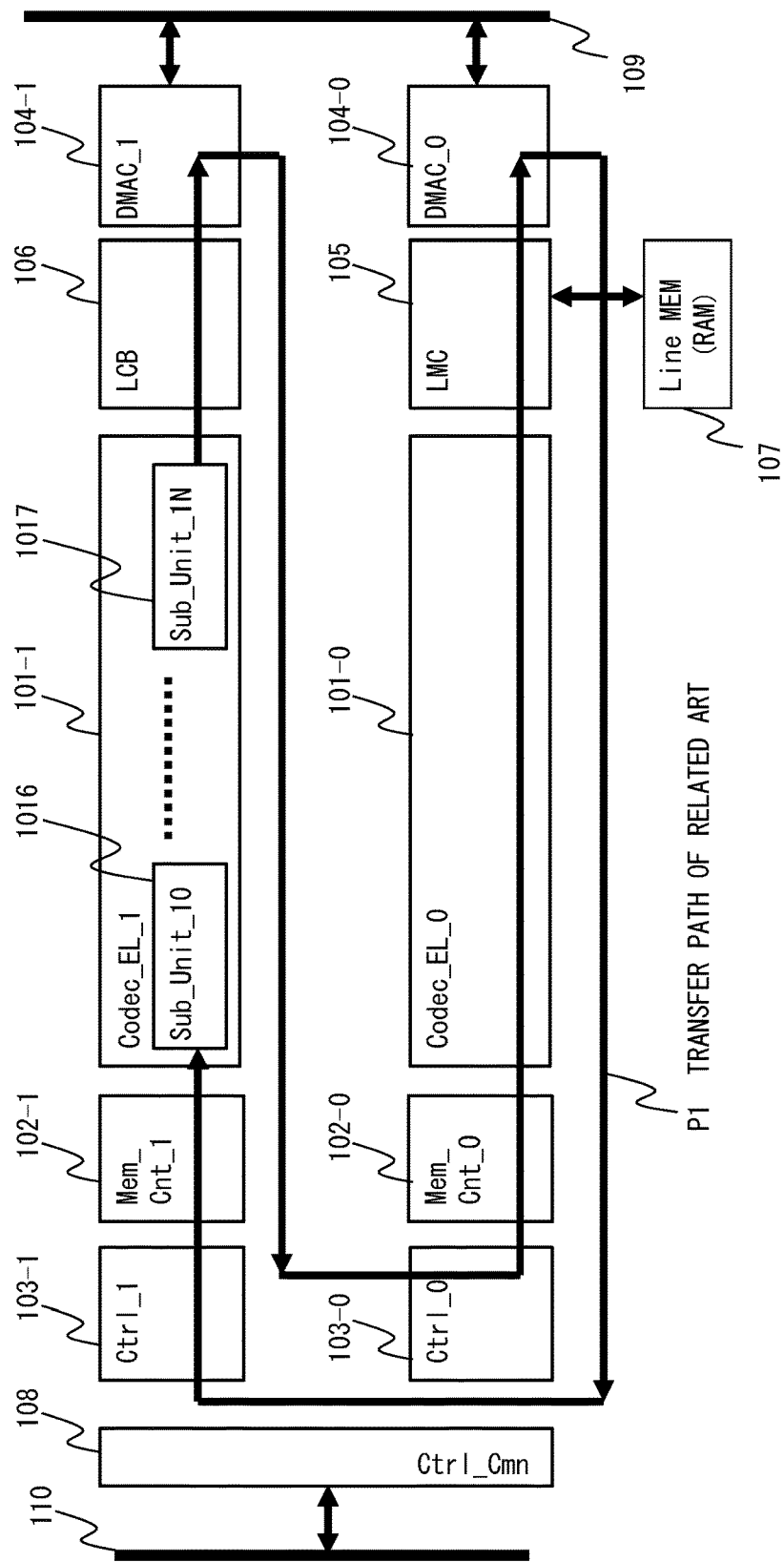
FIG. 4 is a diagram showing an example of a transfer path when data is transferred between functional subunits within a moving picture processing unit in related art.

FIG. 4 is a diagram showing an example of a transfer path when data is transferred between the functional subunits within the same Codec_EL in the moving picture coding/ decoding apparatus of the related art. The moving picture coding/decoding apparatus of the related art shown in FIG. 4 is different from that of the first embodiment in that the Codec_EL_0 101-0 and the Codec_EL_1 101-1 are connected so that they form a ring shape by the same ring bus as in the technique disclosed in Japanese Unexamined Patent Application Publication No. 2008-42571. Referring to FIG. 4, the Codec_EL_1 101-1 includes N+1 functional subunits from a 0th Sub_Unit_10 1016 to an N (N is a natural number equal to or greater than 1)-th Sub_Unit_1N 1017. For example, a case where data is transferred from the Sub_Unit_1N 1017 within the Codec_EL_1 101-1 to the Sub_Unit_10 1016 within the Codec_EL_1 101-1 will now be considered. In the related art, the Codec_EL_0 101-0 and the Codec_EL_1 101-1 are connected so that they form a ring shape by the same ring bus. Accordingly, the data is transferred to the Sub_Unit_10 1016 via a transfer path P1 which passes through the LCB 106, the DMAC_1 104-1, the Ctrl_0 103-0, the Mem_Cnt_0 102-0, the functional subunits within the Codec_EL_0 101-0, the LMC 105, the DMAC_0 104-0, the Ctrl_1 103-1, and the Mem_Cnt_1 102-1. Thus, the data is transferred through an extremely long path. Further, since the data of the Codec_EL_1 101-1, which is the other moving picture processing unit, flows through the Ctrl_0 103-0, the Mem_Cnt_0 102-0, the Codec_EL_0 101-0, the LMC 105, and the DMAC_0 104-0, the bus traffic increases.

Figure 5:
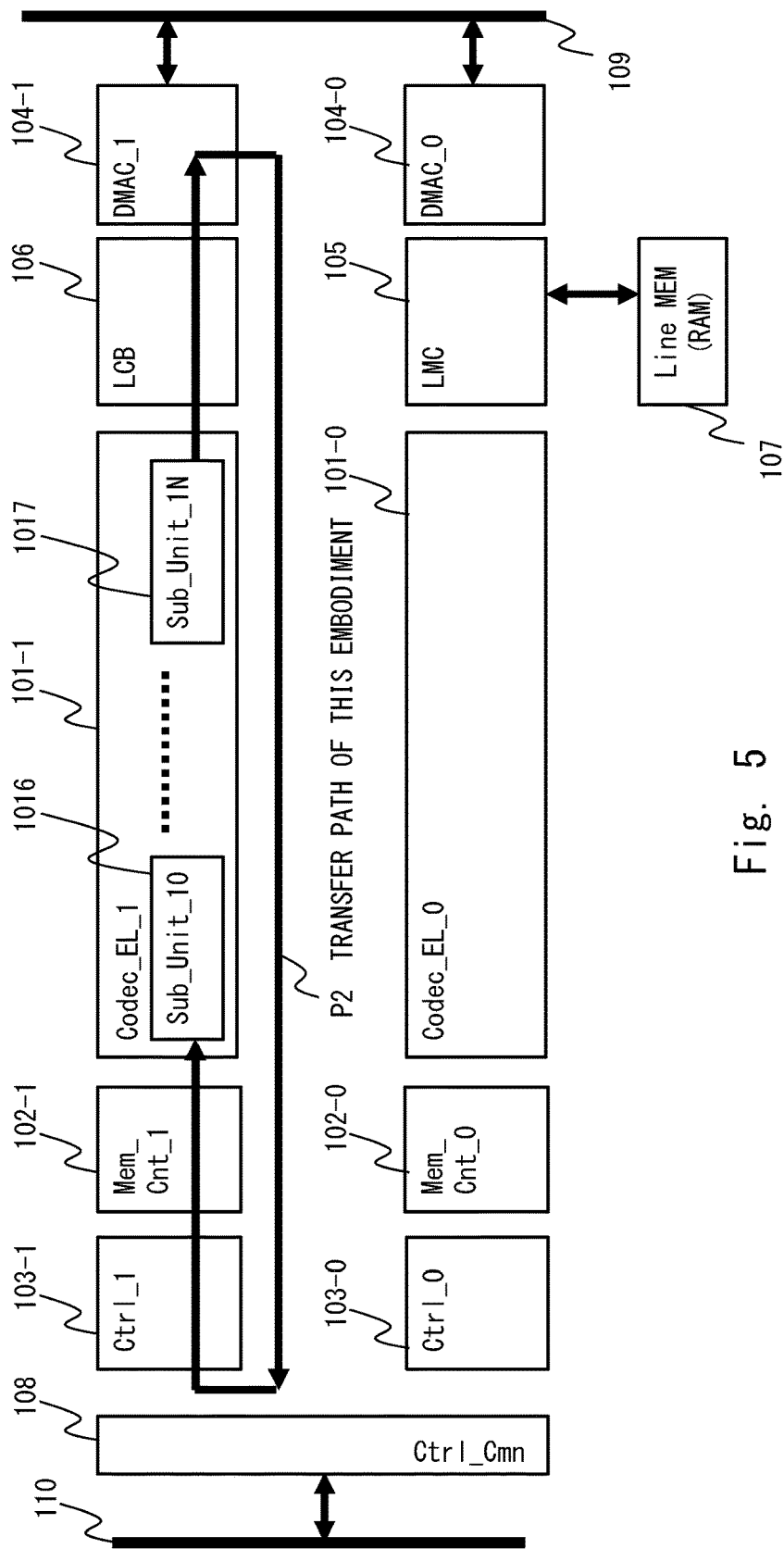
FIG. 5 is a diagram showing an example of a transfer path when data is transferred between functional subunits within a moving picture processing unit in the first embodiment.
Figure 6:
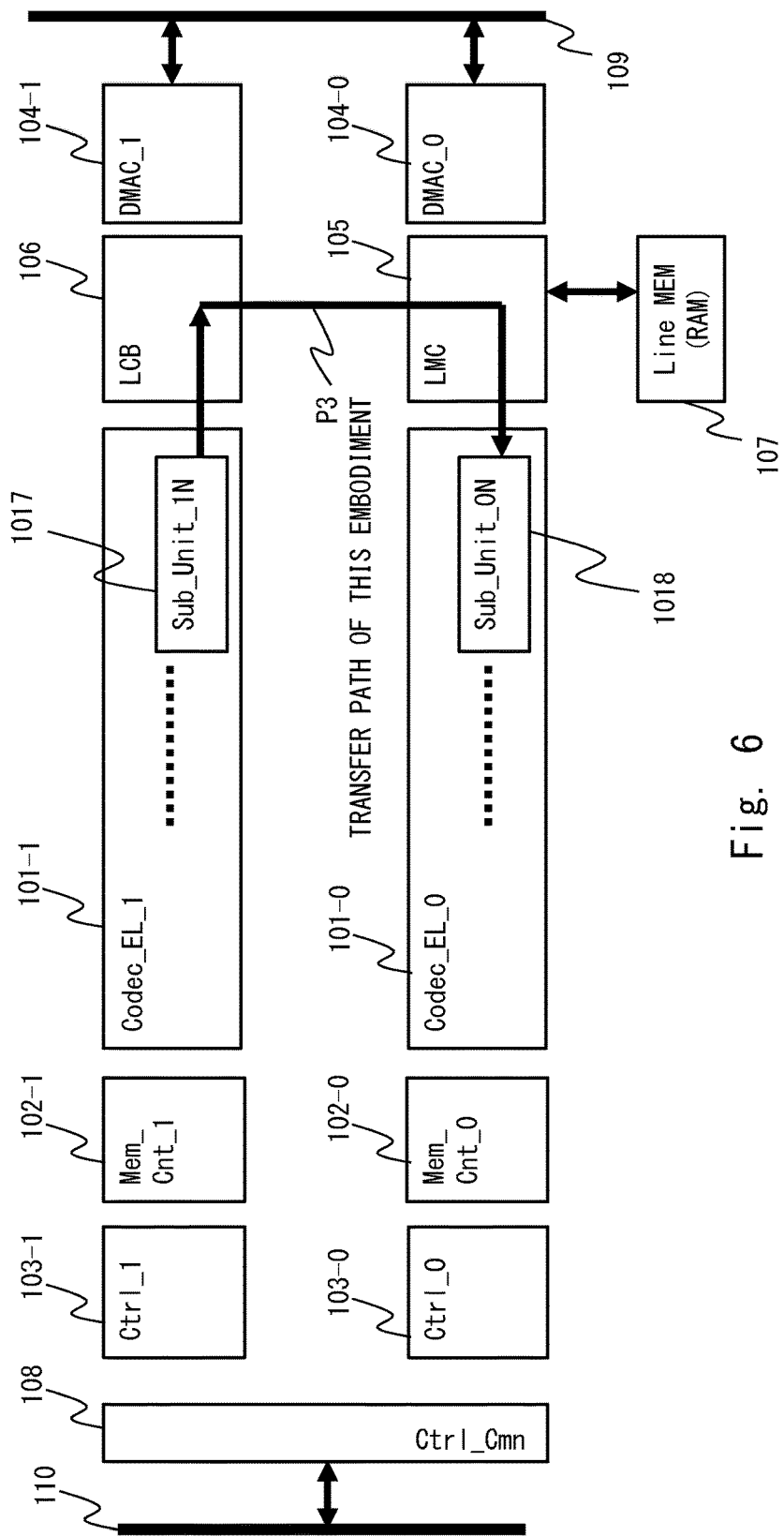
FIG. 6 is a diagram showing an example of a transfer path when data is transferred between functional subunits within different moving picture processing units in the first embodiment.

FIGS. 5 and 6 are diagrams showing examples of the transfer path in the moving picture coding/decoding apparatus according to the first embodiment. In the first embodiment, each of the first ring buses 111-0 and 111-1 is a bidirectional ring bus having two clockwise and counterclockwise ring buses. Various methods can be employed to use the bidirectional ring bus. In the first embodiment, assume that when the functional subunits within the Codec_EL transfer data by using the first ring bus, the clockwise ring bus is used, while when the LMC 105 or the LCB 106 transfers the data, which is received via the second ring bus 112, by using the first ring bus, the counterclockwise ring bus is used.

FIG. 5 is a diagram showing an example of a transfer path when data is transferred between the functional subunits within the same Codec_EL. As in the case described above, a case where data is transferred from the Sub_Unit_1N 1017 within the Codec_EL_1 101-1 to the Sub_Unit_10 1016 within the Codec_EL_1 101-1 will be considered. In the first embodiment, the functional subunits within the Codec_EL_1 101-1 are connected so that they form a ring shape by the first ring bus 111-1 which is provided separately from the Codec_EL_0 101-0. The Sub_Unit_1N 1017 transfers the data by using the clockwise bus of the first ring bus 111-1. Accordingly, the data is transferred to the Sub_Unit_10 1016 via a transfer path P2 which passes through the LCB 106, the DMAC_1 104-1, the Ctrl_1 103-1, and the Mem_Cnt_1 102-1. Thus, the transfer path can be shortened in comparison to the transfer path of the related art. In addition, the data of the Codec_EL_1 101-1 does not flow to the Codec_EL_0 101-0, which prevents an increase in the bus traffic in the Codec_EL_0 101-0 due to the data of the Codec_EL_1 101-1.

FIG. 6 is a diagram showing an example of a transfer path when data is transferred between the functional subunits within different Codec_ELs. For example, when moving picture coding or decoding processing is performed on the coding target image 200 shown in FIG. 2, the processing result for an upper parallel processing region is referred to in the processing for a lower parallel processing region in some cases. As a result, a transfer of data across the Codec_EL_1 101-1 and the Codec_EL_0 101-0 occurs. An example of such a data transfer is a transfer of data in the Line MEM 107. Accordingly, it is impossible to transfer data between the Codec_EL_1 101-1 and the Codec_EL_0 101-0 only by connecting the Codec_EL_1 101-1 and the Codec_EL_0 101-0 by the first ring buses 111-0 and 111-1, respectively. Accordingly, the LCB 106 and the LMC 105 are connected by the second ring bus 112. This enables the data transfer between the Codec_EL_1 101-1 and the Codec_EL_0 101-0. A case where data is transferred from the Sub_Unit_1N 1017 within the Codec_EL_1 101-1 to a Sub_Unit_0N 1018 within the Codec_EL_0 101-0 as shown in FIG. 6 will now be considered. In this case, the data is transferred to the Sub_Unit_0N 1018 via a transfer path P3 which passes through the LCB 106 and the LMC 105. The data transfer via the second ring bus 112 enables the data transfer to the Sub_Unit_0N 1018. The Sub_Unit_1N 1017 transfers the data to the LCB 106 by using the clockwise ring bus of the first ring bus 111-1. The LCB 106 transfers the data to the LMC 105 by using the second ring bus 112. Since the LMC 105 has received the data via the second ring bus 112, as described above, the data is transferred to the Sub_Unit_0N 1018 by using the counterclockwise ring bus of the first ring bus 111-0.

(1-3) Advantageous Effects of First Embodiment

In the technique disclosed in Japanese Unexamined Patent Application Publication No. 2008-42571, a plurality of moving picture processing units are connected so that they form a ring shape by the same ring bus. This causes a problem that a transfer of data across the other moving picture processing unit occurs, which results in an increase in the transfer path. There is another problem that the bus traffic increases due to the data of other moving picture processing units. On the other hand, in the first embodiment, the functional subunits within each moving picture processing unit are connected so that they form a ring shape by a ring bus (first ring bus) which is provided separately for each moving picture processing unit. Further, the moving picture processing units are connected so that they form a ring shape by another ring bus (second ring bus). Accordingly, in the first embodiment, the transfer of data in each moving picture processing unit is performed using the first ring bus and the transfer of data between the moving picture processing units is performed using the second ring bus. Thus, a transfer of data across the other moving picture processing unit does not occur, so that the transfer path can be shortened. At the same time, an increase in the bus traffic in the other moving picture processing unit can be prevented.

In the technique disclosed in Japanese Unexamined Patent Application Publication No. 2008-42571, in order to achieve downsizing of the apparatus by sharing the moving picture memory for storing moving picture data, one Mem_Cnt, which is a memory controller that controls reading and writing of moving picture data from and to the moving picture memory, and one DMAC, which is a bus IF for connecting an external bus, are provided for a plurality of moving picture processing units. On the other hand, in the first embodiment, since more emphasis is placed on the variability and ease of the configuration than on downsizing of the apparatus by sharing the moving picture memory, the Mem_Cnt and the DMAC are disposed for each moving picture processing unit and are connected to the ring bus (first ring bus) for each moving picture processing unit. Further, the LMC and the LCB are configured to be connected by another ring bus (second ring bus) which is different from the first ring bus. Accordingly, in the case of extending the moving picture processing units, it is only necessary to extend the Ctrl_Cmn and change the connection of the second ring bus. Thus, the moving picture processing units can be easily extended, unlike in the technique disclosed in Japanese Unexamined Patent Application Publication No. 2008-42571.

In the technique disclosed in Japanese Unexamined Patent Application Publication No. H05-181817, PEs in a plurality of rows (second to fourth rows) in each layer are connected to PEs in other layers. This causes a deterioration in wiring performance and an increase in area. On the other hand, in the first embodiment, only the LMC and the LCB are connected by a ring bus (second ring bus). Thus, a deterioration in wiring performance and an increase in area can be prevented, unlike in the technique disclosed in Japanese Unexamined Patent Application Publication No. H05-181817.

(1-4) Modified Example of First Embodiment

Figure 7:
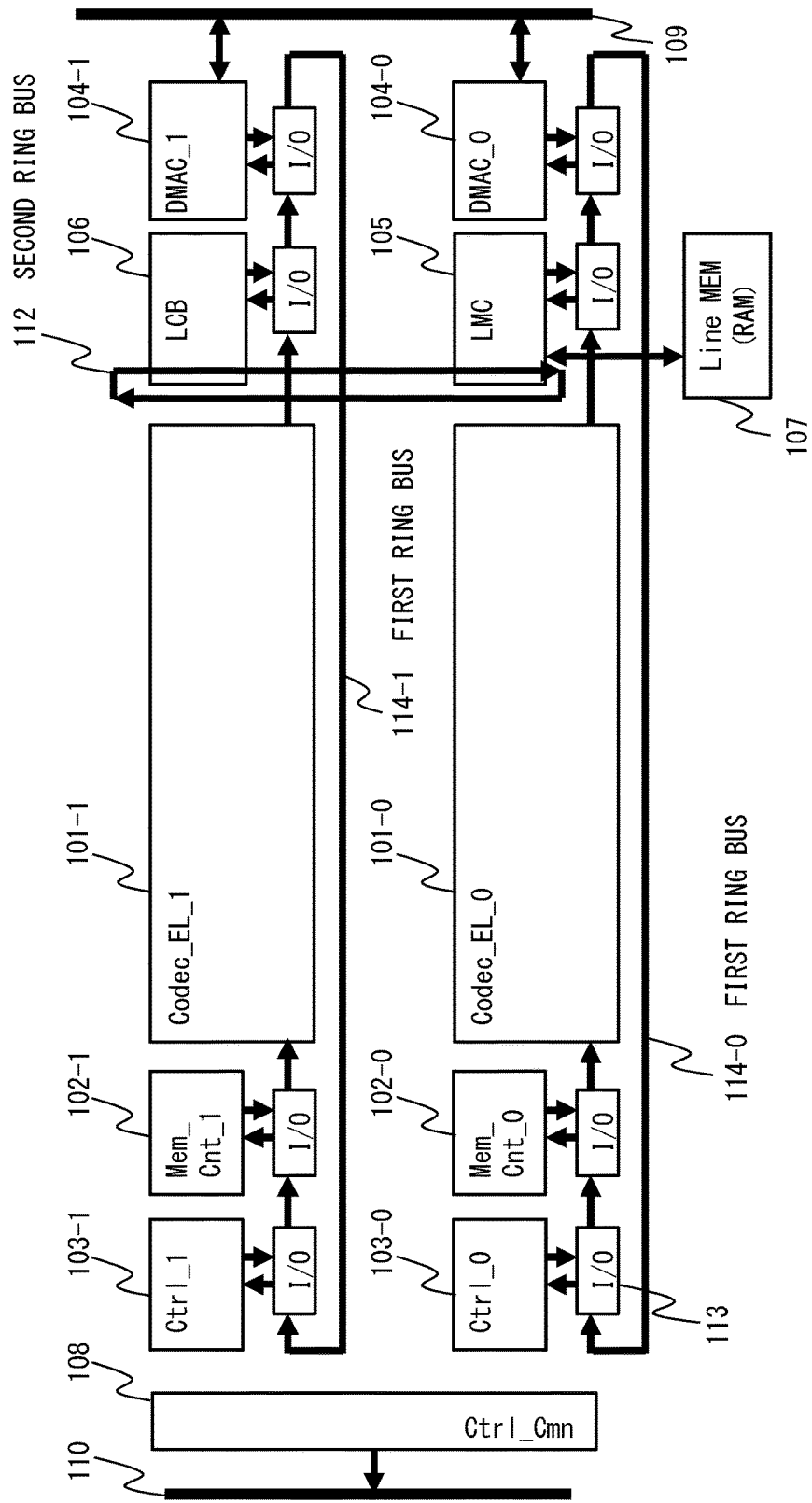
FIG. 7 is a diagram showing a block configuration example of the moving picture coding/decoding apparatus according to the first embodiment.

FIG. 7 is a diagram showing a block configuration example of a modified example of the moving picture coding/decoding apparatus according to the first embodiment. In the moving picture coding/decoding apparatus shown in FIG. 1, the first ring buses 111-0 and 111-1 are separately formed for the respective Codec_EL_0 101-0 and the Codec_EL_1 101-1. This contributes to a reduction in the length of the transfer path in comparison to that in the technique disclosed in Japanese Unexamined Patent Application Publication No. 2008-42571. Further, Japanese Unexamined Patent Application Publication No. 2008-42571 discloses a technique for changing the data transfer direction of the ring bus to the opposite direction, as a technique for shortening the transfer path. However, since the transfer path can be shortened in the first embodiment as described above, there is no need for the technique to change the data transfer direction. Accordingly, there is no need to use bidirectional ring buses for the first ring buses 111-0 and 111-1, and unidirectional ring buses can be used for the first ring buses 111-0 and 111-1.

In this modified example, first ring buses 114-0 and 114-1 which are unidirectional ring buses each having one transfer direction are provided instead of the first ring buses 111-0 and 111-1 which are bidirectional ring buses. While FIG. 7 illustrates an example in which the first ring buses 114-0 and 114-1 are clockwise ring buses, the first ring buses 114-0 and 114-1 are not limited to these ring buses.

Note that in this modified example, the first ring buses 114-0 and 114-1 are each composed of a unidirectional ring bus. Accordingly, all data are transferred in a clockwise direction. The other operations are similar to those of the first embodiment.

Unlike in the configuration shown in FIG. 1, the first ring buses are changed from the bidirectional ring buses to the unidirectional ring buses in this modified example, so that the number of internal buses can be reduced by one. Thus, a further reduction in the circuit size and an improvement of the wiring performance can be achieved. Such advantageous effects become more remarkable when a larger number of bits are used for the internal bus.

(2) Second Embodiment
(2-1) Configuration of Second Embodiment

The second embodiment is a modified example of the moving picture coding/decoding apparatus according to the first embodiment.

Figure 8:
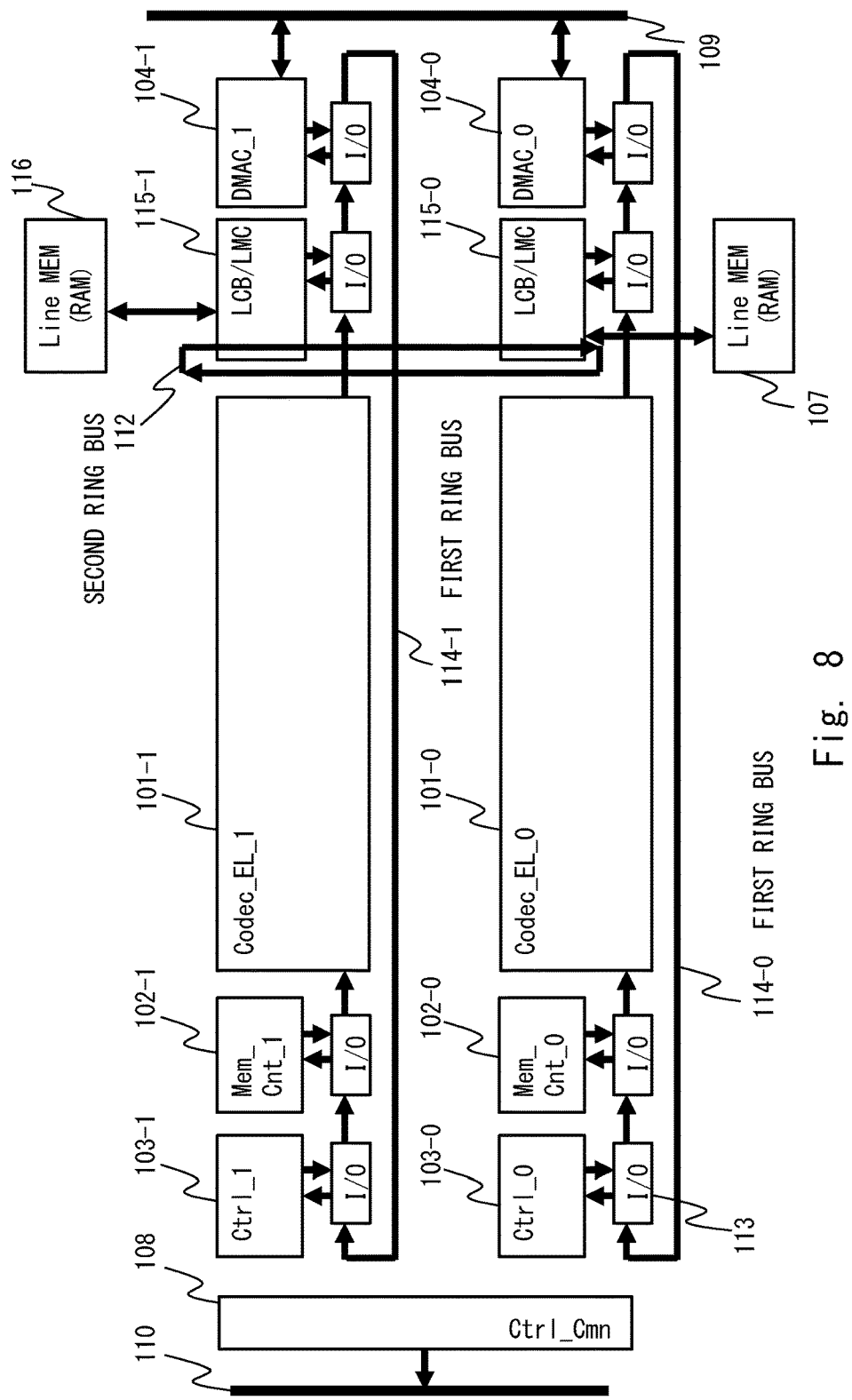
FIG. 8 is a diagram showing a block configuration example of a moving picture coding/decoding apparatus according to a second embodiment.

FIG. 8 is a diagram showing a block configuration example of a moving picture coding/decoding apparatus according to the second embodiment. The moving picture coding/decoding apparatus according to the second embodiment differs from that of the second embodiment shown in FIG. 7 in that the LMC 105 and the LCB 106 are replaced by an LCB/LMC 115-0 and an LCB/LMC 115-1, respectively, and a Line MEM 116 is added. The other configuration of the second embodiment is the same as that of the first embodiment. In the configuration shown in FIG. 8, the unidirectional first ring buses 114-0 and 114-1 shown in FIG. 7 are used, but the bidirectional first ring buses 111-0 and 111-1 shown in FIG. 1 may also be used.

In the first embodiment, the LMC 105 and the LCB 106, which have different functions, are provided for the Codec_EL_0 101-0 and the Codec_EL_1 101-1, respectively. On the other hand, the second embodiment has a configuration in which the LMC 105 and the LCB 106 are replaced by the LCB/LMC 115-0 and the LCB/LMC 115-1, respectively, which are modules each having the functions of both the LCB and the LMC. Further, in the first embodiment, the Line MEM 107 is connected only to the LMC 105. On the other hand, the second embodiment has a configuration in which the Line MEM 107 and the Line MEM 116 are connected to the LCB/LMC 115-0 and the LCB/LMC 115-1, respectively. In the second embodiment, the Line MEM 107 stores the processing result of the Codec_EL_0 101-0 and the like, and the Line MEM 116 stores the processing result of the Codec_EL_1 101-1 and the like. The LCB/LMC 115-0 is a module which, for example, controls reading and writing of the processing result and the like from and to the Line MEM 107. For example, the LCB/LMC 115-0 writes the processing result of the Codec_EL_0 101-0 to the Line MEM 107. The LCB/LMC 115-0 reads out the processing result of the Codec_EL_0 101-0 from the Line MEM 107, and transfers the read processing result to the LCB/LMC 115-1 or the Codec_EL_0 101-0. The LCB/LMC 115-0 receives the processing result of the Codec_EL_1 101-1 from the LCB/LMC 115-1, and transfers the received processing result to the Codec_EL_0 101-0. The LCB/LMC 115-1 is a module which, for example, controls reading and writing of the processing result and the like from and to the Line MEM 116. For example, the LCB/LMC 115-1 writes the processing result of the Codec_EL_1 101-1 to the Line MEM 116. The LCB/LMC 115-1 reads out the processing result of the Codec_EL_1 101-1 from the Line MEM 116, and transfers the read processing result to the LCB/LMC 115-0 or the Codec_EL_1 101-1. The LCB/LMC 115-1 receives the processing result of the Codec_EL_0 101-0 from the LCB/LMC 115-0, and transfers the received processing result to the Codec_EL_1 101-1.

(2-2) Operation of Second Embodiment

In the second embodiment, each of the Codec_EL_0 101-0 and the Codec_EL_1 101-1 includes the LCB/LMC and the line MEM. This configuration allows the Codec_EL_0 101-0 and the Codec_EL_1 101-1 to operate separately. Thus, the Codec_EL_0 101-0 and the Codec_EL_1 101-1 can perform different coding processings or decoding processings separately. For example, it is possible to implement a configuration in which the Codec_EL_0 101-0 performs decoding processing and the Codec_EL_1 101-1 performs coding processing. In addition, the Codec_EL_0 101-0 and the Codec_EL_1 101-1 can perform different image coding processings separately, and can also perform different image combining processings separately. As in the first and second embodiments described above, the Codec_EL_0 101-0 and the Codec_EL_1 101-1 can perform coding processing and decoding processing in parallel on different parallel processing regions of the same image, as a matter of course.

(2-3) Advantageous Effects of Second Embodiment

Advantageous effects of the second embodiment are similar to those of the first embodiment. However, when different coding processings or decoding processings are assigned to the plurality of moving picture processing units in the second embodiment, the second embodiment is superior in the following respects.

There is no deterioration in performance due to interference between the moving picture processing units. As in the first embodiment described above, a transfer of data across the other moving picture processing unit does not occur in the second embodiment. Accordingly, when different processings are assigned to the plurality of moving picture processing units, no deterioration in performance due to interference between the moving picture processing units occurs.

It is easy to control the Mem_Cnt and the DMAC. In the technique disclosed in Japanese Unexamined Patent Application Publication No. 2008-42571, one Mem_Cnt and one DMAC are provided for a plurality of moving picture processing units, which makes the control complicated. On the other hand, in the second embodiment, one Mem_Cnt and one DMAC are provided for each Codec_EL. Thus, the Mem_Cnt and the DMAC can be controlled separately, which facilitates the control.

It is easy to control the reset and interruption of clocks. In the technique disclosed in Japanese Unexamined Patent Application Publication No. 2008-42571, one Mem_Cnt and one DMAC are provided for a plurality of moving picture units and a transfer of data across the other moving picture processing unit occurs, which makes it difficult to control the reset and interruption of clocks. On the other hand, in the second embodiment, when different processings are assigned to the plurality of moving picture processing units, the moving picture processing units do not interfere with each other, which facilitates the control of the reset and interruption of clocks.

(2-4) Modified Example of Second Embodiment

According to the second embodiment, it is possible to cause a plurality of Codec_ELs to operate separately. Accordingly, failure detection in the Codec_ELs can be implemented by assigning the same coding processing or decoding processing to the plurality of Codec_ELs and comparing the processing results.

Figure 9:
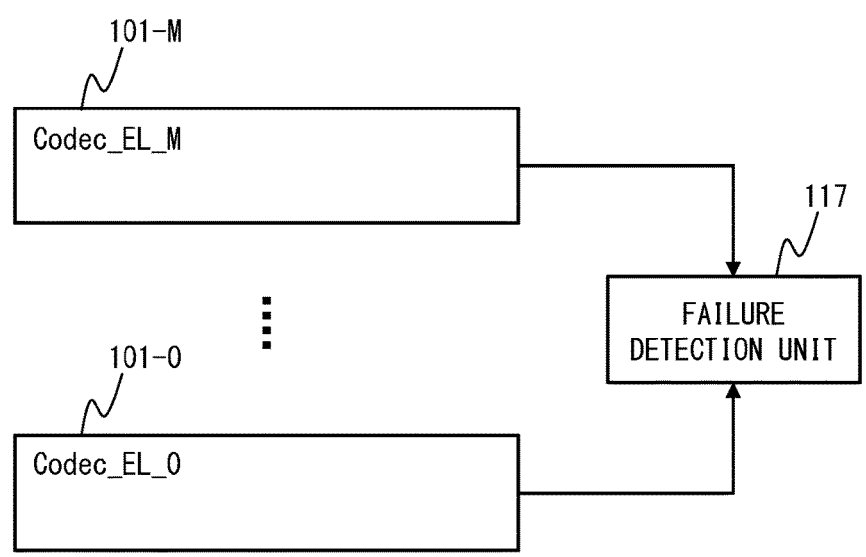
FIG. 9 is a diagram showing a block configuration example of a modified example of the moving picture coding/decoding apparatus according to the second embodiment.

FIG. 9 is a diagram showing a block configuration example of a modified example of the moving picture coding/decoding apparatus according to the second embodiment. This modified example corresponds to a configuration in which M (M is a natural number equal to or greater than 1)+1 moving picture processing units (the Codec_EL_0 101-0 to the Codec_EL_M 101-M) are provided and a failure detection unit 117 is added in the configuration shown in FIG. 8. Note that in FIG. 9, the illustration of the components shown in FIG. 8 other than the Codec_ELs is omitted.

The failure detection unit 117 compares the processing results of the Codec_EL_0 101-0 to the Codec_EL_M 101-M, and detects a failure in the Codec_EL_0 101-0 to the Codec_EL_M 101-M based on the comparison result.

Failure detection processing according to this modified example will be described below.

Figure 10:
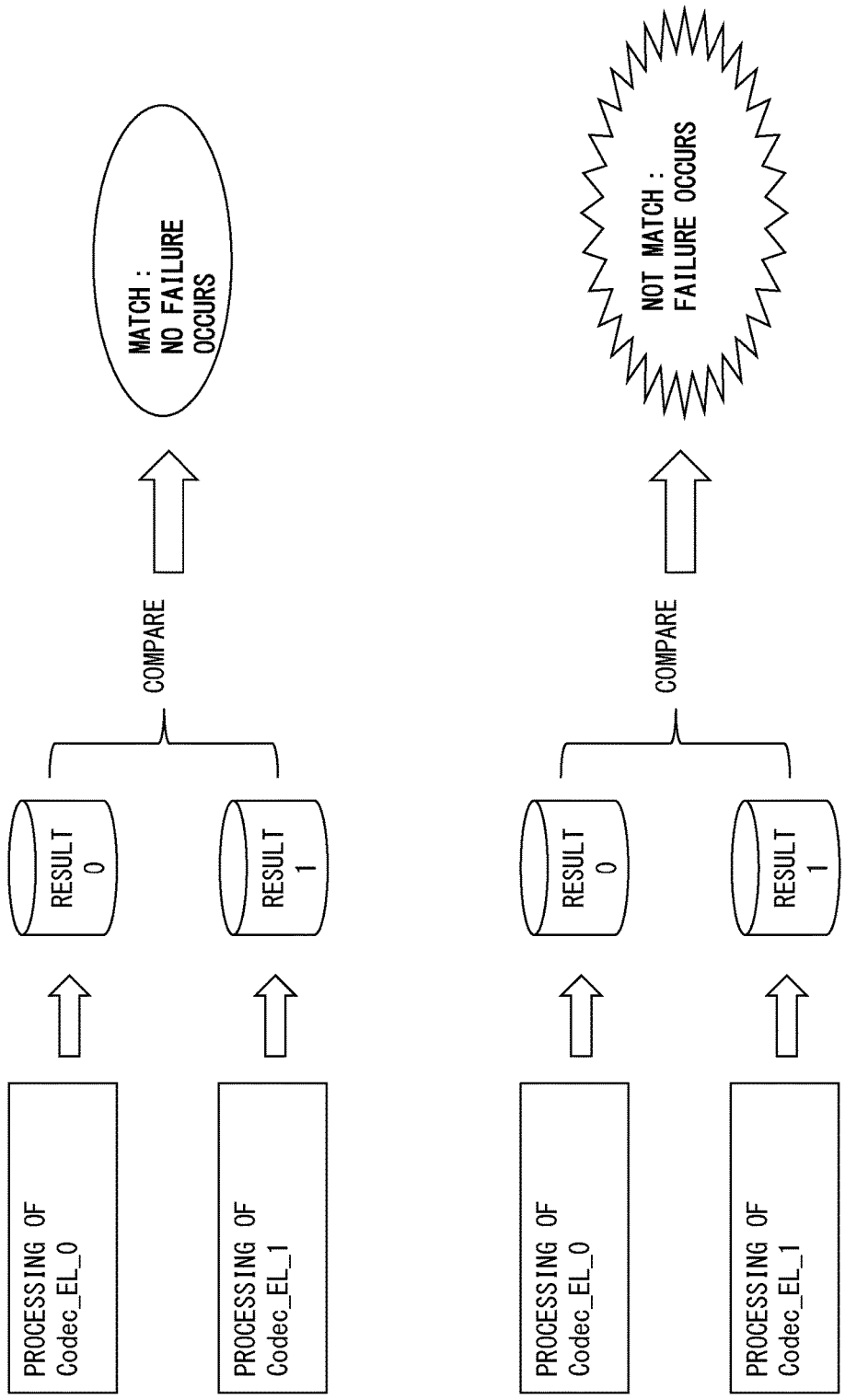
FIG. 10 is a diagram showing an example of failure detection processing in the modified example of the moving picture coding/decoding apparatus according to the second embodiment.

FIG. 10 shows an example of failure detection processing performed on the Codec_EL_0 101-0 and the Codec_EL_1 101-1 when M=1. The processing results of the Codec_EL_0 101-0 and the Codec_EL_1 101-1 are referred to as "result 0" and "result 1", respectively. When the result 0 matches the result 1 as a result of comparing the result 0 with the result 1, the failure detection unit 117 can determine that no failure has occurred in the Codec_EL_0 101-0 and the Codec_EL_1 101-1. On the other hand, when the result 0 and the result 1 do not match as a result of comparing the result 0 with the result 1, the failure detection unit 117 can determine that a failure has occurred in the Codec_EL_0 101-0 or the Codec_EL_1 101-1.

Figure 11:
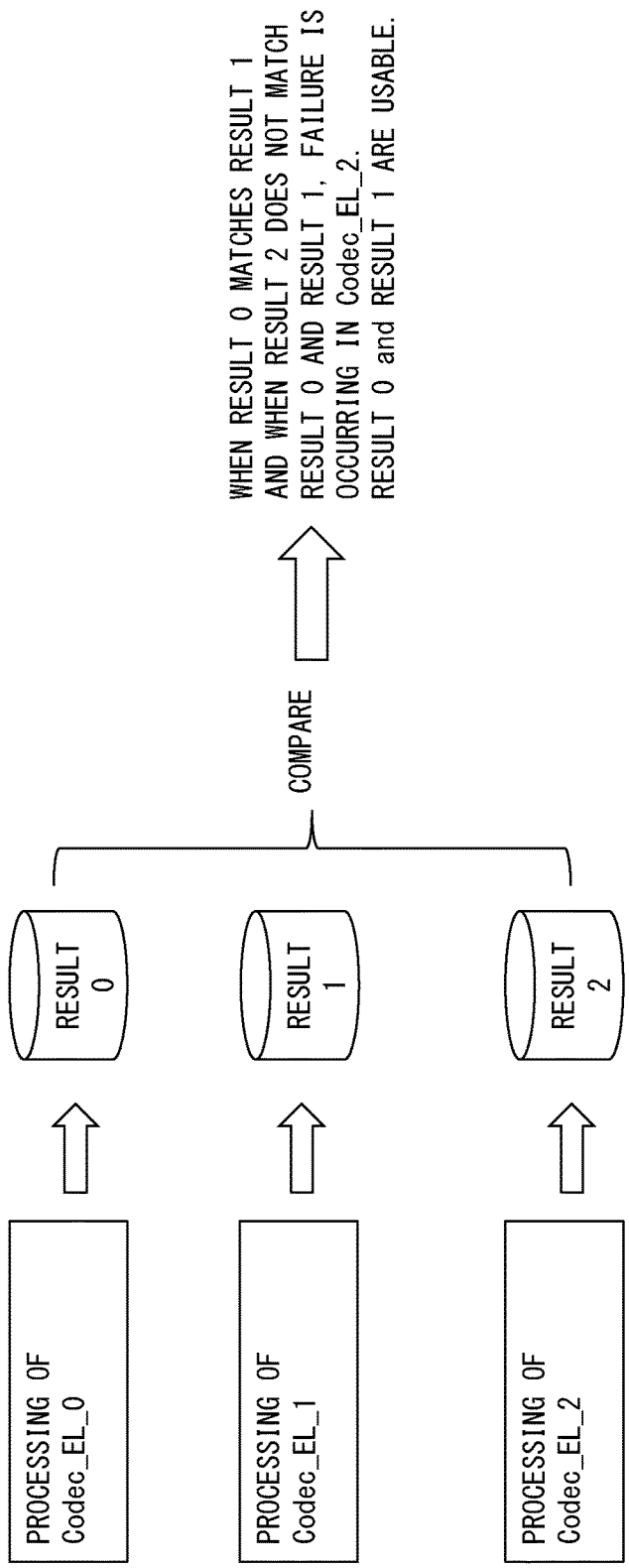
FIG. 11 is a diagram showing another example of failure detection processing in the modified example of the moving picture coding/decoding apparatus according to the second embodiment.

FIG. 11 shows an example of failure detection processing performed on the Codec_EL_0 101-0, the Codec_EL_1 101-1, and the Codec_EL_2 101-2 when M=2. The processing results of the Codec_EL_0 101-0, the Codec_EL_1 101-1, and the Codec_EL_2 101-2 are referred to as "result 0", "result 1", and "result 2", respectively. For example, when the result 0 matches the result 1 and the result 2 does not match the results 0 and 1 as a result of comparing the result 0, the result 1, and the result 2, the failure detection unit 117 can determine that a failure has occurred in the Codec_EL_2 101-2. In this case, the failure detection unit 117 can also determine that no failure has occurred in the Codec_EL_0 101-0 and the Codec_EL_1 101-1. Accordingly, the result 0 and the result 1, which are the processing results of the Codec_EL_0 101-0 and the Codec_EL_1 101-1, respectively, can be used in the subsequent processing.

(3) Third Embodiment

The third embodiment is an example in which the processing apparatus is a core processor. This core processor includes a plurality of processor groups as processing units.

Figure 12:
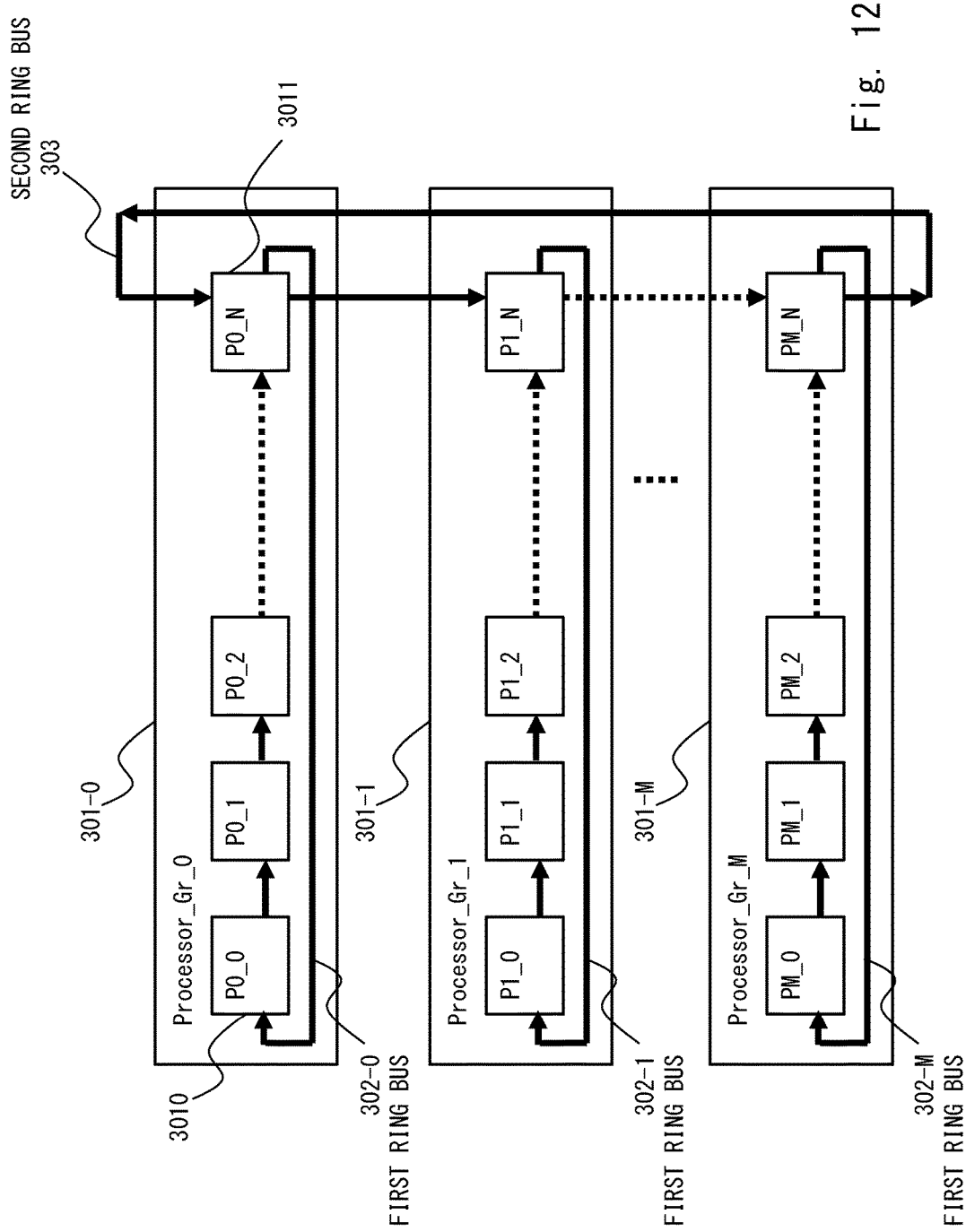
FIG. 12 is a diagram showing a block configuration example of a core processor according to a third embodiment.

FIG. 12 is a diagram showing a block configuration example of the core processor according to the third embodiment. The core processor according to the third embodiment includes M (M is a natural number equal to or greater than 1)+1 processor groups, i.e., a Processor_Gr_0 301-0 to a Processor_Gr_M 301-M. Each processor group includes N (N is a natural number equal to or greater than 1) processors Pm_n (m=0, . . . , and M, and n=0, . . . , and N−1) 3010 and processors Pm_N (m=0, . . . , and M) 3011 each serving as a transfer module that transfers data to other processing groups.

In the core processor according to the third embodiment, the processors P0_n 3010 and P0_N 3011 within the Processor_Gr_0 301-0 are connected so that they form a ring shape by a first ring bus 302-0. Similarly, the processors P1_n 3010 and P1_N 3011 within the Processor_Gr_1 301-1 are connected so that they form a ring shape by a first ring bus 302-1. Similarly, the processor PM_n 3010 and the PM_N 3011 within the Processor_Gr_M 301-M are connected so that they form a ring shape by a first ring bus 302-M. Further, the processors Pm_N 3011 in the respective processor groups are connected so that they form a ring shape by a second ring bus 303 which is a ring bus different from the first ring buses 302-0 to 302M.

In the technique disclosed in Japanese Unexamined Patent Application Publication No. H05-181817, the packets which are not addressed to the PEs of the corresponding layer are caused to flow through the ring bus 701, which causes a problem that there is an increase in the bus traffic due to the packets in other layers. On the other hand, in the third embodiment, the communication between the processors in the respective processor groups, which require a close cooperation, such as processors P0_0, P0_1, P0_2, . . . , and P0_N within the Processor_Gr_0 301-0, is performed using the first ring bus 302-0. Further, the communication between the processor groups is performed using the second ring bus 303. With this configuration, the data of other processor groups is prevented from flowing through the ring bus (first ring bus), thereby preventing an increase in the bus traffic due to the data of other processor groups.

In the technique disclosed in Japanese Unexamined Patent Application Publication No. H05-181817, PEs in a plurality of rows (second to fourth rows) in each layer are connected to PEs in other layers. On the other hand, in the third embodiment, only the Pm_n 3011 is connected by a ring bus (second ring bus). Thus, a deterioration in wiring performance and an increase in area can be prevented, unlike in the technique disclosed in Japanese Unexamined Patent Application Publication No. H05-181817.

(4) Concepts of First to Third Embodiments

Figure 13:
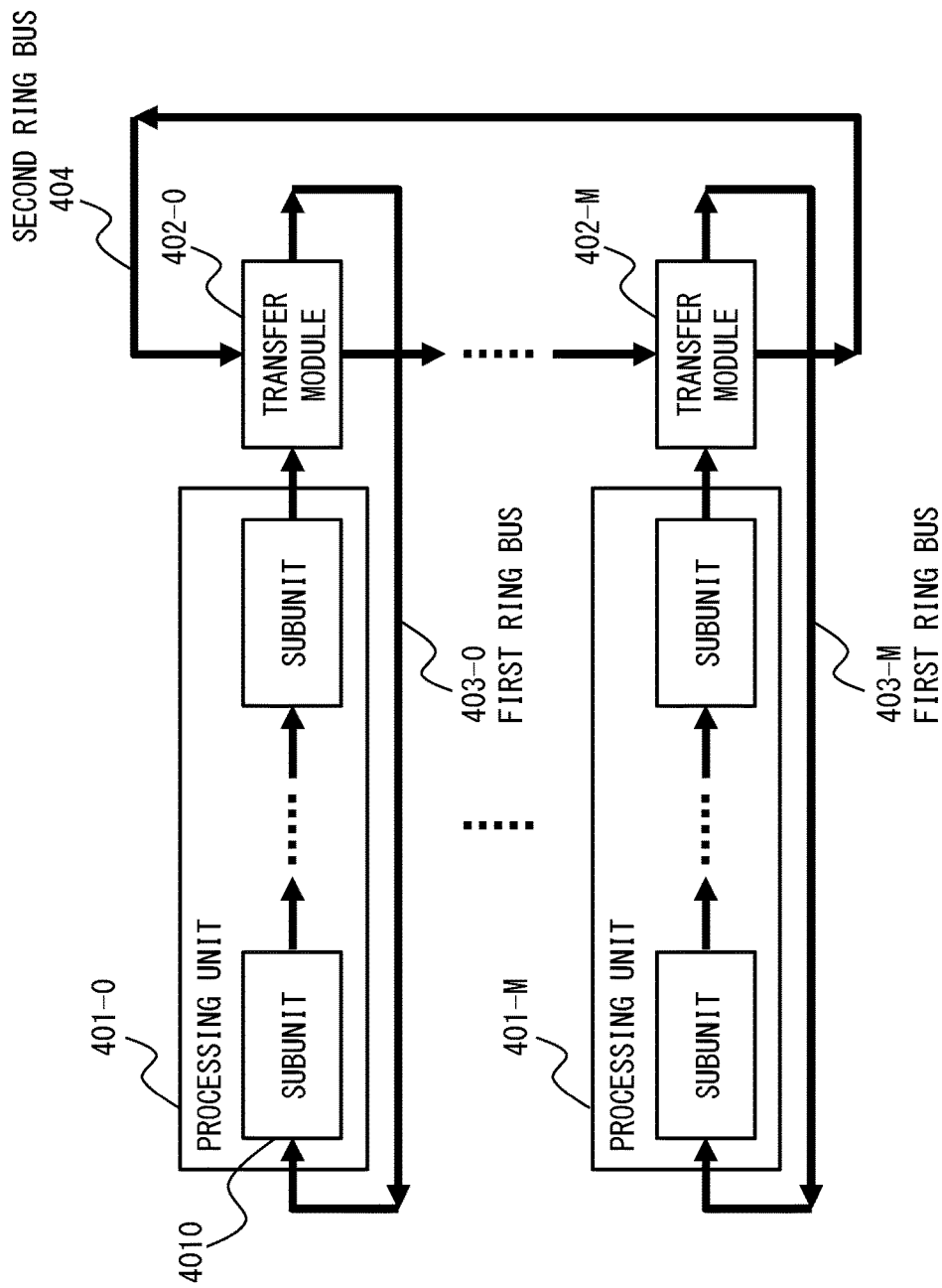
FIG. 13 is a conceptual diagram showing a block configuration example of a processing apparatus according to the first to third embodiments.

FIG. 13 is a conceptual diagram showing a block configuration example of the processing apparatus according to the first to third embodiments described above. The processing apparatus shown in FIG. 13 includes M (M is a natural number equal to or greater than 1)+1 processing units 401-0 to 401-M, M+1 transfer modules 402-0 to 402-M, M+1 first ring buses 403-0 to 403-M, and a second ring bus 404.

The processing units 401-0 to 401-M are processing units capable of performing processing in parallel, and each include N (N is a natural number equal to or greater than 1) subunits 4010. The processing units 401-0 to 401-M respectively correspond to the Codec_EL_0 101-0 to the Codec_EL_M 101-M which are moving picture processing units. Also, the processing units 401-0 to 401-M respectively correspond to the Processor_Gr_0 301-0 to the Processor_Gr_M 301-M which are processor groups. The subunits 4010 correspond to the variable length coding unit (VLC) 1010, the integer pixel accuracy motion estimation unit (CME) 1011, the fractional pixel accuracy motion estimation unit (FME) 1012, the motion compensation unit (MC) 1013, the frequency transform unit (TRF) 1014, and the deblocking filter processing unit (DEB) 1015, respectively. The subunits 4010 correspond to the processors Pm_n (m=0, . . . , and M, and n=0, . . . , and N−1) 3010, respectively, and also correspond to the processors Pm_N (m=0, . . . , and M) 3011, respectively.

The transfer modules 402-0 to 402-M are modules which are provided so as to respectively correspond to the processing units 401-0 to 401-M and transfer data between the processing units 401-0 to 401-M. The transfer modules 402-0 to 402-M correspond to the LMC 105, the LCB 106, the LCB/LMC 115-0, the LCB/LMC 115-1, and the processors Pm_N (m=0, . . . , and M) 3011. Note that in FIG. 13, the transfer modules 402-0 to 402-M are each provided on the outside of the corresponding processing unit 401, but may be provided within the corresponding processing unit 401.

The first ring buses 403-0 to 403-M are ring buses which are provided so as to respectively correspond to the processing units 401-0 to 401-M and connect the subunits 4010 within the corresponding processing unit 401 and the transfer module 402 corresponding to the processing unit 401 so that they form a ring shape. The first ring buses 403-0 to 403-M correspond to the first ring buses 111-0, 111-1, 114-0, 114-1, and 302-0 to 302-M. Note that in FIG. 13, the first ring buses 403-0 to 403-M are illustrated as clockwise unidirectional ring buses. However, counterclockwise unidirectional ring buses, or bidirectional ring buses having two clockwise and counterclockwise ring buses may also be used.

The second ring bus 404 is a ring bus that connects the transfer modules 402-0 to 402-M so that they form a ring shape. The second ring bus 404 corresponds to the second ring buses 112 and 303.

In the processing apparatus shown in FIG. 13, the subunits within each processing unit are connected so that they form a ring shape by the first ring bus which is separately provided for each processing unit. Further, the processing units are connected so that they form a ring shape by the second ring bus which is different from the first ring bus. In this configuration, the transfer of data in each processing unit is performed using the first ring bus and the transfer of data between the processing units is performed using the second ring bus.

Thus, a transfer of data across the other processing unit dose not occur during the data transfer, so that the transfer path can be shortened. Further, since the data of the other processing unit does not flow to the first ring bus of a certain processing unit, which prevents an increase in the bus traffic due to the data of other processing units. Moreover, since only the transfer modules are connected to other processing units, a deterioration in wiring performance and an increase in area increase can be prevented.

The invention made by the present inventors has been described above with reference to embodiments. However, the present invention is not limited to the embodiments and can be modified in various ways without departing from the scope of the invention.

The first to third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A processing apparatus comprising:
    a plurality of processing units;
    a plurality of transfer modules, separate from the plurality of processing units, that are provided so as to respectively correspond to the plurality of processing units, and transfer data between the processing units;
    a plurality of first ring buses that are provided so as to respectively correspond to the plurality of processing units, each of the plurality of first ring buses connecting subunits within a corresponding processing unit and the transfer module corresponding to the processing unit so that they form a ring to transfer data in each of the processing units;
    a second ring bus that connects the plurality of transfer modules detached from plurality of processing units so that the plurality of transfer modules form a ring to transfer data between each of the processing units; and
    a failure detection unit that compares processing results of the plurality of processing units and detects a failure in the plurality of processing units based on a result of the comparison.

2. The processing apparatus according to claim 1, wherein each of the plurality of processing units comprises a moving picture processing unit that performs coding processing and decoding processing on a moving picture, and wherein the second ring bus directly connects the plurality of transfer modules to form the ring to transfer data received by the plurality of transfer modules from each of the corresponding plurality of processing units.

3. The processing apparatus according to claim 2, further comprising a line memory that stores a processing result obtained by the plurality of processing units, wherein
each of the plurality of transfer modules transfers the processing result between the processing units, and
one of the plurality of transfer modules controls reading and writing of the processing result from and to the line memory.

4. The processing apparatus according to claim 2, further comprising a plurality of line memories that are provided so as to respectively correspond to the plurality of processing units and store a processing result obtained by a corresponding processing unit,
wherein each of the plurality of transfer modules controls reading and writing of the processing result from and to a corresponding line memory.

5. The processing apparatus according to claim 4, wherein different coding processings or decoding processings are assigned to the plurality of processing units.

6. The processing apparatus according to claim 4, wherein the same coding processing or decoding processing is assigned to the plurality of processing units.

7. The processing apparatus according to claim 2, further comprising:
a plurality of memory controllers that are provided so as to respectively correspond to the plurality of processing units, and control reading and writing of a moving picture from and to a moving picture memory that stores a moving picture to be supplied to a corresponding processing unit; and
a plurality of direct memory access controllers that are provided so as to respectively correspond to the plurality of processing units, the plurality of direct memory access controllers each serving as an interface for connecting a corresponding processing unit to a bus.

8. The processing apparatus according to claim 1, wherein each of the plurality of processing units is a processor group including a plurality of processors as the subunits.

9. The processing apparatus according to claim 1, wherein each of the plurality of transfer modules is one of a plurality of processors.

10. The processing apparatus according to claim 1, wherein the transfer module comprises a transfer circuit, and
wherein the plurality of transfer modules respectively correspond to each of the plurality of processing units.

11. The processing apparatus according to claim 1, wherein the transfer module comprises any of a line control block, line memory controller, a line control block/line memory controller, and a processor.

12. A processing apparatus comprising:
a plurality of processing units;
a plurality of transfer modules, separate from the plurality of processing units, that are provided so as to respectively correspond to the plurality of processing units, and transfer data between the processing units;
a plurality of first ring buses that are provided so as to respectively correspond to the plurality of processing units, each of the plurality of first ring buses connecting subunits within a corresponding of processing unit and the transfer module corresponding to the processing unit so that they form a ring to transfer data in each of the processing units; and
a second ring bus that connects the plurality of transfer modules detached from plurality of processing units so that the plurality of transfer modules form a ring to transfer data between each of the processing units,
wherein each of the first ring buses is a bidirectional ring bus formed of two ring busses having opposite transfer directions,
wherein the plurality of transfer modules comprises:
a first transfer module corresponding to a first processing unit from among the plurality of processing units, the first transfer module includes a line control block, and
a second transfer module correspond to a second processing unit from among the plurality of processing units, the second transfer module includes a line memory controller,
wherein the line control block transfers a coding or decoding processing result of the first processing unit to the line memory controller of the second transfer module,
wherein the line memory controller reads out a coding or decoding processing result of the second processing unit from a line memory, and transfers the read coding or decoding processing result to the line control block of the first processing unit to form the second ring bus, and
wherein each of the subunits implement functions for performing coding or decoding processing to form the first ring bus.

13. The processing apparatus according to claim 12, wherein one of the two ring buses is used when the subunits within the respective processing units transfer data by the first ring buses, and the other one of the two ring buses is used when the transfer modules transfer, by the first ring buses, data received via the second ring bus.

14. A processing apparatus comprising:
a plurality of processing units;
a plurality of transfer modules, separate from the plurality of processing units, that are provided so as to respectively correspond to the plurality of processing units, and transfer data between the processing units;
a plurality of first ring buses that are provided so as to respectively correspond to the plurality of processing units, each of the plurality of first ring buses connecting subunits within a corresponding of processing unit and the transfer module corresponding to the processing unit so that they form a ring to transfer data in each of the processing units; and
a second ring bus that connects the plurality of transfer modules detached from plurality of processing units so that the plurality of transfer modules form a ring to transfer data between each of the processing units,
wherein each of the first ring buses is a unidirectional ring bus having one transfer direction, and
wherein each of the subunits implement functions for performing coding processing and decoding processing on a moving picture.

15. A control method for a processing apparatus including a plurality of processing units, the control method comprising:
providing a plurality of transfer modules, separate from the plurality of processing units, that transfer data between the processing units, the plurality of transfer modules being provided so as to respectively correspond to the plurality of processing units;
connecting, for each of the plurality of processing units, subunits within a corresponding processing unit and the transfer module corresponding to the processing unit so that they form a ring by a first ring path to transfer data in each of the processing units;

connecting the plurality of transfer modules so that they form a ring by a second ring bus to transfer data between each of the processing units;

comparing processing results of the plurality of processing units; and detecting a failure in the plurality of processing units based on a result of the comparison.

16. A processing apparatus comprising:

a plurality of processing units;

a plurality of transfer modules, each separately connected to a corresponding one the processing units, that are provided so as to respectively correspond to the plurality of processing units, and transfer data between the processing units;

a plurality of first buses that are provided so as to respectively correspond to the plurality of processing units, each of the plurality of first buses connecting subunits within a corresponding processing unit and the transfer module corresponding to the processing unit so that they form a loop to transfer data within each of the processing units;

a second bus that connects the plurality of transfer modules to form a loop;

a failure detection that compares processing results pf the plurality of processing units and detects a failure in the plurality of processing units based on a result of the comparison.

17. The processing apparatus according to claim 16, wherein each of the plurality of processing units comprises a moving picture processing unit that performs coding processing and decoding processing on a moving picture.

18. The processing apparatus according to claim 16, further comprising a line memory that stores a processing result obtained by the plurality of processing units, wherein each of the plurality of transfer modules transfers the processing result between the processing units, one of the plurality of transfer modules controls reading and writing of the processing result from and to the line memory, and wherein only the plurality of transfer modules are connected between the plurality of processing units.

\* \* \* \* \*